US012499216B2

(12) United States Patent
Inokuchi et al.

(10) Patent No.: US 12,499,216 B2
(45) Date of Patent: Dec. 16, 2025

(54) DISPLAY APPARATUS, DISPLAY SYSTEM, DISPLAY METHOD, AND NON-TRANSITORY COMPUTER-READABLE MEDIUM

(71) Applicant: NEC Corporation, Tokyo (JP)

(72) Inventors: Masaki Inokuchi, Tokyo (JP); Tomohiko Yagyu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 172 days.

(21) Appl. No.: 18/273,429

(22) PCT Filed: Jan. 28, 2021

(86) PCT No.: PCT/JP2021/002986
§ 371 (c)(1),
(2) Date: Jul. 20, 2023

(87) PCT Pub. No.: WO2022/162821
PCT Pub. Date: Aug. 4, 2022

(65) Prior Publication Data
US 2024/0095345 A1 Mar. 21, 2024

(51) Int. Cl.
*G06F 21/55* (2013.01)
*H04L 9/14* (2006.01)
(52) U.S. Cl.
CPC ............... *G06F 21/55* (2013.01); *H04L 9/14* (2013.01)
(58) Field of Classification Search
CPC .................................... G06F 21/55; H04L 9/14
See application file for complete search history.

(56) References Cited

U.S. PATENT DOCUMENTS

| 10,789,366 | B2 * | 9/2020 | Sato ...................... H04L 63/145 |
| 11,593,477 | B1 * | 2/2023 | Thimmegowda ..... G06F 21/552 |
| 11,671,457 | B2 * | 6/2023 | Yeh ..................... H04L 63/0281 |
| | | | 726/23 |

(Continued)

FOREIGN PATENT DOCUMENTS

| CN | 2002-334061 A | 11/2002 |
| CN | 104823470 A | 8/2015 |

(Continued)

OTHER PUBLICATIONS

JP Office Action for JP Application No. 2022-577907, mailed on Jul. 30, 2024 with English Translation.

(Continued)

*Primary Examiner* — Oleg Korsak

(57) ABSTRACT

A display apparatus (10) includes an acquiring unit (11) configured to acquire configuration information of an information system that includes a plurality of nodes; a determining unit (12) configured to determine a display method of displaying an object of security information display concerning a node in the acquired configuration information, based on a security characteristic of an attackable element used to attack the object of security information display and a security characteristic of a preventive measure element preventing an attack on the object of security information display; and a display unit (13) configured to, when displaying a system configuration of the information system, display the object of security information display in accordance with the determined display method.

20 Claims, 19 Drawing Sheets

(56) References Cited

U.S. PATENT DOCUMENTS

| | | | |
|---|---|---|---|
| 11,677,760 B2* | 6/2023 | Shahbaz | G06F 21/53 |
| | | | 726/23 |
| 2004/0215978 A1* | 10/2004 | Okajo | H04L 63/0227 |
| | | | 726/1 |
| 2005/0257268 A1 | 11/2005 | Guo et al. | |
| 2012/0216270 A1 | 8/2012 | Anderson et al. | |
| 2014/0373162 A1* | 12/2014 | Mahaffey | G06F 21/577 |
| | | | 726/25 |
| 2016/0099963 A1* | 4/2016 | Mahaffey | H04L 63/166 |
| | | | 726/25 |
| 2016/0232373 A1* | 8/2016 | Chen | G06F 21/6218 |
| 2019/0138727 A1* | 5/2019 | Dontov | G06F 11/1464 |
| 2019/0266194 A1* | 8/2019 | Kawakita | G06F 16/00 |
| 2020/0004957 A1* | 1/2020 | Chamaraju | G06N 20/00 |
| 2020/0364376 A1* | 11/2020 | Li | G06F 21/556 |
| 2021/0021614 A1* | 1/2021 | Shahbaz | H04L 63/1475 |
| 2021/0064761 A1* | 3/2021 | Kawakita | G06F 21/54 |
| 2021/0117251 A1* | 4/2021 | Cristofi | G06F 21/554 |
| 2021/0342442 A1* | 11/2021 | Anderson | G06N 20/00 |
| 2023/0126967 A1* | 4/2023 | Suzuki | G06F 21/554 |
| | | | 726/22 |

FOREIGN PATENT DOCUMENTS

| | | |
|---|---|---|
| CN | 111800427 A | 10/2020 |
| JP | H09-204385 A | 8/1997 |
| JP | 2016-218964 A | 12/2016 |
| JP | 2017-107405 A | 6/2017 |
| JP | 2018-029276 A | 2/2018 |
| JP | 2020-166521 A | 10/2020 |
| WO | 2017/221299 A1 | 12/2017 |

OTHER PUBLICATIONS

Yoshiaki Yasuda, "Solution close-up", Nikkei Communications No. 558, Japan, Nikkei Business Publications, Inc., Jul. 1, 2010, pp. 48-51.

International Search Report for PCT Application No. PCT/JP2021/002986, mailed on May 11, 2011.

* cited by examiner

| SECURITY CHARACTERISTICS OF HOST | DISPLAY METHOD OF HOST |
|---|---|
| PRESENCE OR ABSENCE OF VULNERABILITY | ● CHANGE COLOR OF HOST (BLACK TO RED) |
| PRESENCE OR ABSENCE OF OPERATIONAL SERVICE | ● CHANGE BACKGROUND COLOR OF HOST (GREEN TO RED) |
| PRESENCE OR ABSENCE OF FILTER PROVIDED BY HOST FIREWALL | |
| PRESENCE OR ABSENCE OF DATA FLOW TO BE TRANSMITTED OR RECEIVED | ● ICON FOR HOST |
| PRESENCE OR ABSENCE OF CREDENTIAL | |
| PRESENCE OR ABSENCE OF USER OPERATION | ● LABEL ATTACHED TO HOST |
| PRESENCE OR ABSENCE OF SECURITY MEASURE PRODUCT | |

Fig. 6

| SECURITY CHARACTERISTICS OF HOST-TO-HOST COMMUNICATION | DISPLAY METHOD OF HOST-TO-HOST COMMUNICATION |
|---|---|
| DIRECTION OF SESSION | • DIRECTION OF ARROW<br>• COLOR OF LINE<br>• THICKNESS OF LINE<br>• LINE TYPE<br>• LABEL ON LINE<br>• BACKGROUND COLOR OF LINE |
| DIRECTION OF FILE MOVEMENT | |
| PRESENCE OR ABSENCE OF ENCRYPTION OF COMMUNICATION | |
| PRESENCE OR ABSENCE OF LOGIN CREDENTIAL | |
| PRESENCE OR ABSENCE OF COMMAND TO OPERATE DESTINATION HOST | |
| PRESENCE OR ABSENCE OF VULNERABILITY IN SERVER/CLIENT PROGRAM | |
| PRESENCE OR ABSENCE OF NETWORK FIREWALL | |
| PRESENCE OR ABSENCE OF IDS/IPS | |
| PRESENCE OR ABSENCE OF LOGIN SERVICE COMMUNICATION | |

Fig. 7

| CHARACTERISTIC CLASSIFICATION | CLASSIFICATION ELEMENT |
|---|---|
| ATTACKABLE ELEMENT | VULNERABILITY |
| | COMMUNICATION ENVIRONMENT |
| | SERVICE ENVIRONMENT |
| SECURITY MEASURE ELEMENT 1 | SECURITY MEASURE FUNCTION |
| | SECURITY SETTING ENVIRONMENT |
| SECURITY MEASURE ELEMENT 2 | AIMED AT PROTECTION |
| | AIMED AT DETECTION |
| | AIMED AT CONTINUATION OF BUSINESS |
| ATTACK TARGET ELEMENT | ... |
| ATTACK CONDITION ELEMENT | ... |

Fig. 8

| SECURITY CHARACTERISTICS OF HOST | EXAMPLE OF DISPLAY | |
|---|---|---|
| PRESENCE OR ABSENCE OF VULNERABILITY | ADD ICON IF PRESENT : 🔧 | LA1 (RED) |
| PRESENCE OR ABSENCE OF OPERATIONAL SERVICE | ADD ICON IF PRESENT : ⭕ | LA2 (RED) |
| PRESENCE OR ABSENCE OF FILTER PROVIDED BY HOST FW | ADD ICON IF PRESENT : 🧱 | LA3 (BLUE) |
| PRESENCE OR ABSENCE OF DATA TO TRANSMIT | ADD ICON IF PRESENT : ⤒ | LA4 (RED) |
| PRESENCE OR ABSENCE OF DATA TO RECEIVE | ADD ICON IF PRESENT : ⤓ | LA5 (RED) |
| PRESENCE OR ABSENCE OF CREDENTIAL | ADD ICON IF PRESENT : 🔑 | LA6 (RED) |
| PRESENCE OR ABSENCE OF USER OPERATION | ADD ICON IF PRESENT : 👤 | LA7 (RED) |
| PRESENCE OR ABSENCE OF SECURITY MEASURE PRODUCT | ADD ICON IF PRESENT : 🛡 | LA8 (BLUE) |

Fig. 11

| SECURITY CHARACTERISTICS OF HOST-TO-HOST COMMUNICATION | EXAMPLE OF DISPLAY |
|---|---|
| DIRECTION OF SESSION | EXPRESS BY DIRECTION OF ARROW |
| DIRECTION OF FILE MOVEMENT | EXPRESS BY COLOR OF ARROW (BIDIRECTIONAL: RED, FORWARD DIRECTION: GREED, REVERSE DIRECTION: ORANGE, NO FILE TRANSFER: BLACK) |
| PRESENCE OR ABSENCE OF ENCRYPTION OF COMMUNICATION | EXPRESS BY LINE TYPE (WITH ENCRYPTION: SOLID LINE, WITHOUT ENCRYPTION: DOTTED LINE) |
| PRESENCE OR ABSENCE OF LOGIN CREDENTIAL | ADD ICON TO ARROW IF PRESENT :  ~ LB1 |
| PRESENCE OR ABSENCE OF COMMAND TO OPERATE DESTINATION HOST | ADD ICON TO ARROW IF PRESENT : 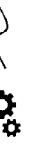 ~ LB2 |
| VULNERABILITY IN SERVER/CLIENT PROGRAM | ADD ICON TO EACH END OF ARROW IF PRESENT :  ~ LB3 |
| PRESENCE OR ABSENCE OF NETWORK FIREWALL | ADD ICON TO ARROW IF PRESENT :  ~ LB4 |
| PRESENCE OR ABSENCE OF IDS/IPS | ADD ICON TO ARROW IF PRESENT :  ~ LB5 |
| LOGIN SERVICE COMMUNICATION | ADD ICON TO ARROW IF PRESENT :  ~ LB6 |

Fig. 12

DISPLAY APPARATUS, DISPLAY SYSTEM, DISPLAY METHOD, AND NON-TRANSITORY COMPUTER-READABLE MEDIUM

This application is a National Stage Entry of PCT/JP2021/002986 filed on Jan. 28, 2021, the contents of all of which are incorporated herein by reference, in their entirety.

TECHNICAL FIELD

The present invention relates to display apparatuses, display systems, display methods, and non-transitory computer-readable media.

BACKGROUND ART

In recent years, cyber attacks that attack vulnerabilities in information systems are on the rise, and research into technologies that analyze security risks posed by cyber attacks is in progress. As related art, Patent Literature 1, for example, is known. Patent Literature 1 discloses a technique of, in a network configuration management apparatus, displaying a network configuration diagram based on a security policy of each constituent element of a network.

CITATION LIST

Patent Literature

Patent Literature 1: Japanese Unexamined Patent Application Publication No. 2018-029276

SUMMARY OF INVENTION

Technical Problem

According to Patent Literature 1, a network configuration diagram is displayed with constituent elements having the same security policy grouped together, and this display enables management of the network. However, the technique in Patent Literature 1 is merely for managing security policies and thus has shortcomings in that it does not allow for easy grasping of the system's security risks.

In view of such circumstances, the present disclosure is directed to providing a display apparatus, a display system, a display method, and a non-transitory computer-readable medium that allows for easy grasping of a security risk.

Solution to Problem

A display apparatus according to the present disclosure includes acquiring means for acquiring configuration information of an information system that includes a plurality of nodes; determining means for determining a display method of displaying an object of security information display concerning a node in the acquired configuration information, based on a security characteristic of an attackable element used to attack the object of security information display and a security characteristic of a preventive measure element preventing an attack on the object of security information display; and display means for, when displaying a system configuration of the information system, displaying the object of security information display in accordance with the determined display method.

A display system according to the present disclosure includes a plurality of nodes constituting an information system and a display apparatus, and the display apparatus includes acquiring means for acquiring configuration information of the information system; determining means for determining a display method of displaying an object of security information display concerning a node in the acquired configuration information, based on a security characteristic of an attackable element used to attack the object of security information display and a security characteristic of a preventive measure element preventing an attack on the object of security information display; and display means for, when displaying a system configuration of the information system, displaying the object of security information display in accordance with the determined display method.

A display method according to the present disclosure includes acquiring configuration information of an information system that includes a plurality of nodes; determining a display method of displaying an object of security information display concerning a node in the acquired configuration information, based on a security characteristic of an attackable element used to attack the object of security information display and a security characteristic of a preventive measure element preventing an attack on the object of security information display; and, when displaying a system configuration of the information system, displaying the object of security information display in accordance with the determined display method.

A non-transitory computer-readable medium according to the present disclosure is a non-transitory computer-readable medium storing a display program that causes a computer to execute the processes of acquiring configuration information of an information system that includes a plurality of nodes; determining a display method of displaying an object of security information display concerning a node in the acquired configuration information, based on a security characteristic of an attackable element used to attack the object of security information display and a security characteristic of a preventive measure element preventing an attack on the object of security information display; and, when displaying a system configuration of the information system, displaying the object of security information display in accordance with the determined display method.

Advantageous Effects of Invention

The present disclosure can provide a display apparatus, a display system, a display method, and a non-transitory computer-readable medium that allows for easy grasping of a security risk.

BRIEF DESCRIPTION OF DRAWINGS

FIG. 6 shows examples of security characteristics of a host and examples of display methods of displaying a host according to the first example embodiment;

FIG. 7 shows examples of security characteristics of host-to-host communication and examples of display methods of displaying host-to-host communication according to the first example embodiment;

FIG. 8 shows an example of classification of security characteristics according to the first example embodiment;

FIG. 11 shows examples of security characteristics of a host and examples of display methods of displaying a host according to the first example embodiment;

FIG. 12 shows examples of security characteristics of host-to-host communication and examples of display methods of displaying host-to-host communication according to the first example embodiment;

EXAMPLE EMBODIMENT

Figure 1:
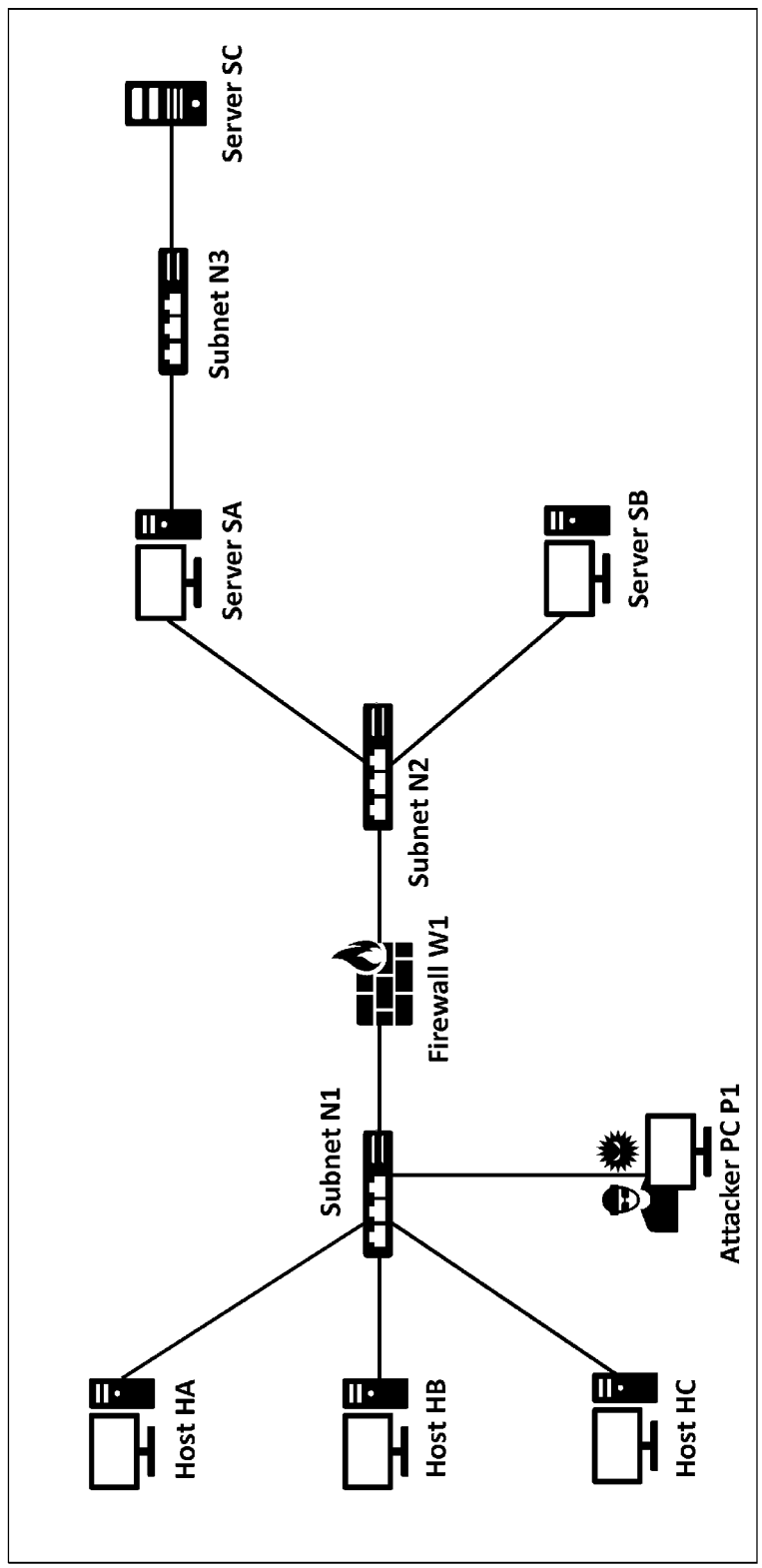
FIG. 1 shows an example of display of a related system configuration diagram.

Hereinafter, some example embodiments will be described with reference to the drawings. In the drawings, identical elements are given identical reference characters, and their repetitive description will be omitted as necessary.

Outline of Example Embodiment

As described above, research on analyzing systems that analyze security risks in information systems is in progress. An analyzing system performs a risk analysis based on input configuration information and calculates an attack route. For example, system configuration information of an object of analysis can be input through a graphical user interface (GUI), and an input host configuration is displayed successively on a screen. In such an analyzing system, a user specifies a range for an analysis by estimating which host is to be used for an attack, and thus an analysis is performed within the specified analysis range.

FIG. 1 shows an example of display of a related system configuration diagram to which an example embodiment is not applied, and this example shows display of a target system on which input is provided to an analyzing system. As shown in FIG. 1, the related example of display displays a system configuration diagram that shows constituent elements of the target system and their relationship in the connection. This example shows hosts HA, HB, and HC, subnets (relay devices) N1, N2, and N3, a firewall W1, servers SA, SB, and SC, and an attacker personal computer (PC) P1 and also shows their relationship in the connection. In order to perform an analysis with the analyzing system, a user may try to specify a range for an analysis by the displayed system configuration diagram.

However, with information merely at the level of a configuration diagram, as in the related example of display, the user cannot, by sight, grasp a site that may be attacked. Information at the level of a configuration diagram merely yields display of information such as host names or the state of connection between an IP address and a host. Therefore, the user cannot estimate where a possible attack may come from and what the possible attack may target. For example, if more detailed information is to be displayed, since information about vulnerability information, operational services, and so forth is generally input in a large amount, it is difficult to display it all.

Figure 2:
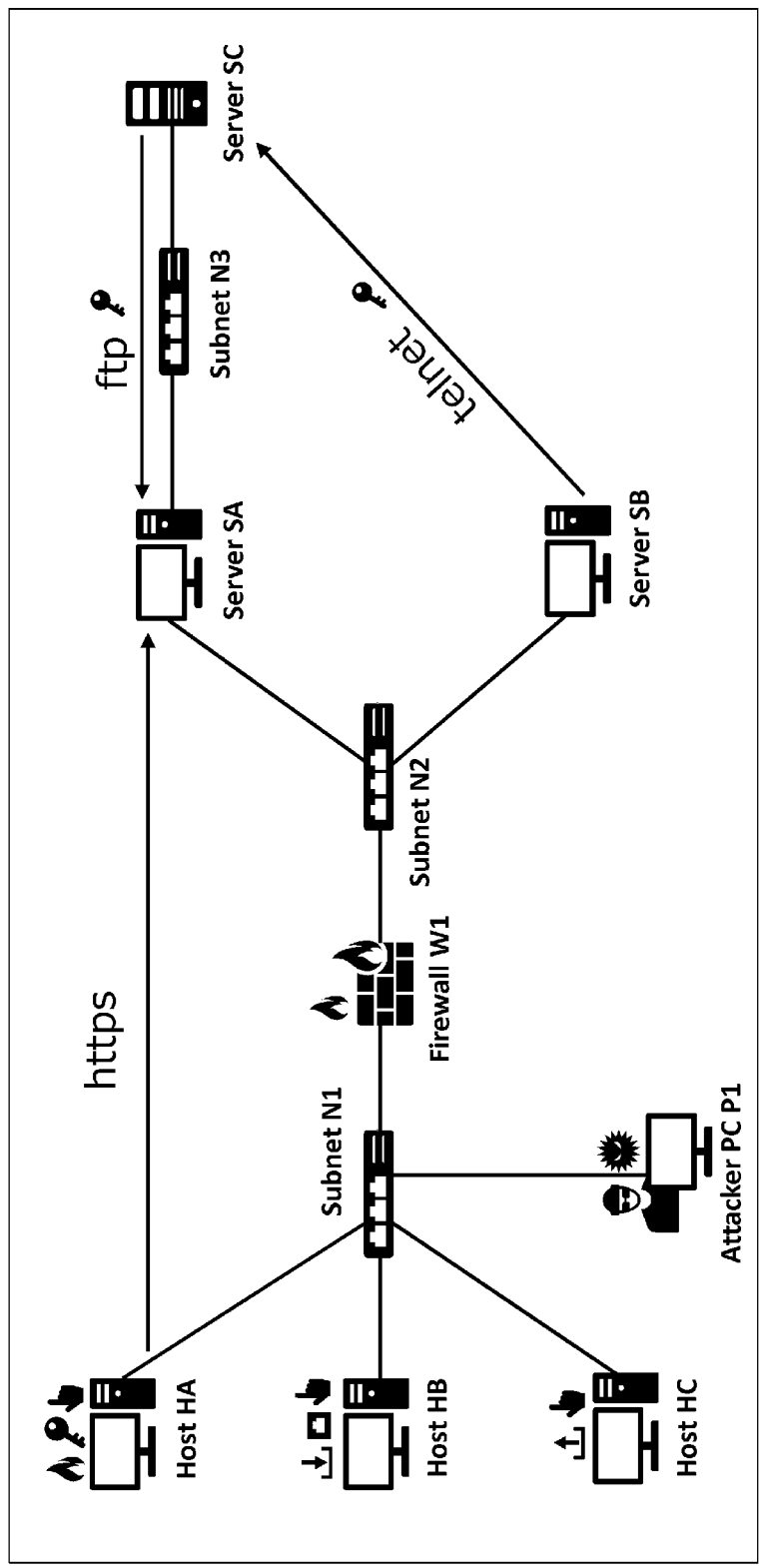
FIG. 2 shows an example of display of a system configuration diagram according to an example embodiment.

Accordingly, in an example embodiment, a label or an arrow, for example, is simply displayed on a screen based on a security characteristic considered from the standpoint of security of a host or of host-to-host communication. FIG. 2 shows an example of display of a system configuration diagram according to an example embodiment. As shown in FIG. 2, in addition to the display shown in FIG. 1, icons for labels indicating security characteristics are displayed next to the hosts, and icons for labels indicating security characteristics are also displayed next to the host-to-host communication. This display allows the user, glancing at the display, to grasp a site that may be attacked.

Figure 3:
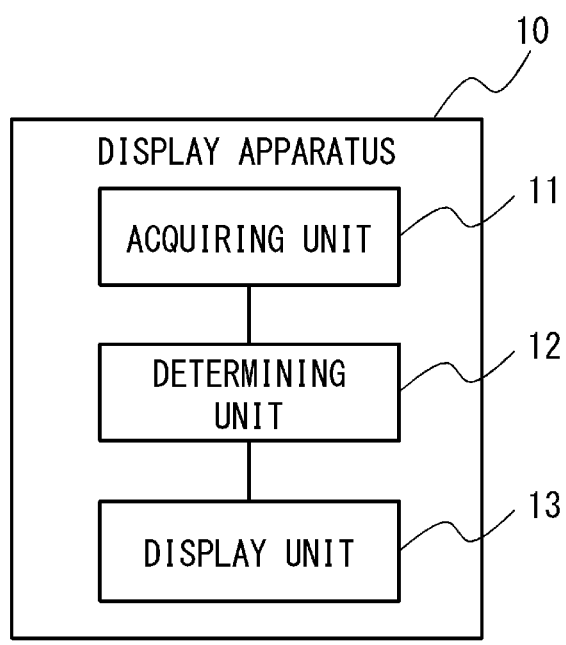
FIG. 3 is a configuration diagram showing an outline of a display apparatus according to an example embodiment.

FIG. 3 shows an outline of a display apparatus according to an example embodiment. As shown in FIG. 3, a display apparatus 10 includes an acquiring unit 11, a determining unit 12, and a display unit 13. The acquiring unit 11 acquires configuration information of an information system that includes a plurality of nodes. A node is a constituent element of the information system and includes any constituent element, such as a host, a subnet (relay device), a firewall, a server, or a PC. Herein, aside from being called a node, such a constituent element may be referred to also as a host.

The determining unit 12, based on a security characteristic of an object of security information display concerning a node in acquired configuration information, determines a display method of displaying the object of security information display. An object of security information display is, for example, a node or node-to-node communication. A security characteristic is classified as a security characteristic of an attackable element to be used to attack an object of security information display or as a security characteristic of a preventive measure element that prevents an attack. Based on a security characteristic of an attackable element or a security characteristic of a preventive measure element, the determining unit 12 determines a display method of displaying an object of security information display. In displaying a system configuration of an information system, the display unit 13 displays an object of security information display in accordance with a determined display method.

In this manner, in the example embodiment, a system configuration diagram is displayed based on security characteristics concerning nodes constituting an information system. In particular, display of an object of security information display, such as a node, is switched based on an element that may be attacked or an element of a preventive measure in security characteristics. This configuration enables recognition of the likelihood that a node is attacked or the likelihood that a node can be protected from an attack and allows for easy grasping of a security risk.

First Example Embodiment

Figure 4:
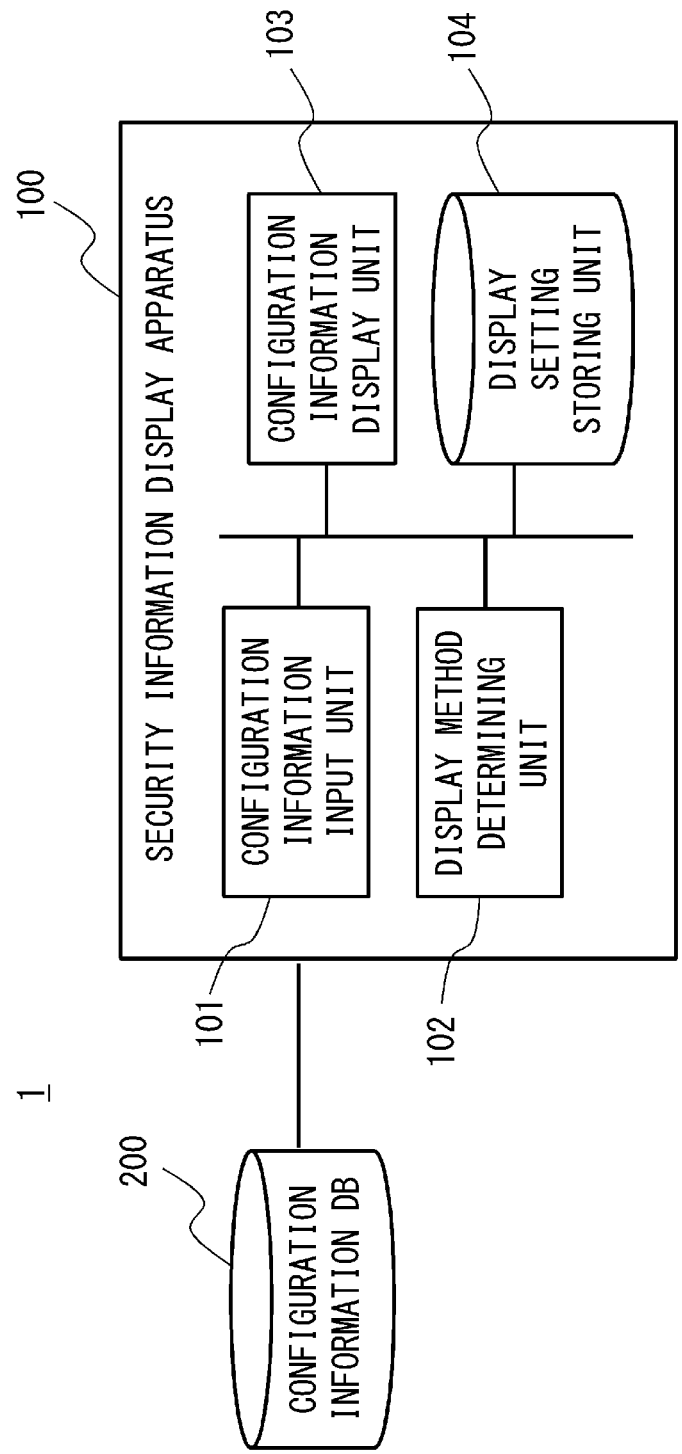
FIG. 4 is a configuration diagram showing an example of a configuration of a display system according to a first example embodiment.

Now, a first example embodiment will be described with reference to drawings. FIG. 4 shows an example of a configuration of a display system according to the present example embodiment. As shown in FIG. 4, a display system 1 according to the present example embodiment includes a security information display apparatus 100 and a configuration information database (DB) 200.

The configuration information DB 200 may be connected to the security information display apparatus 100 directly or via a network, such as the internet. The configuration information DB 200 may be a storage device internal to the security information display apparatus 100.

Figure 5:
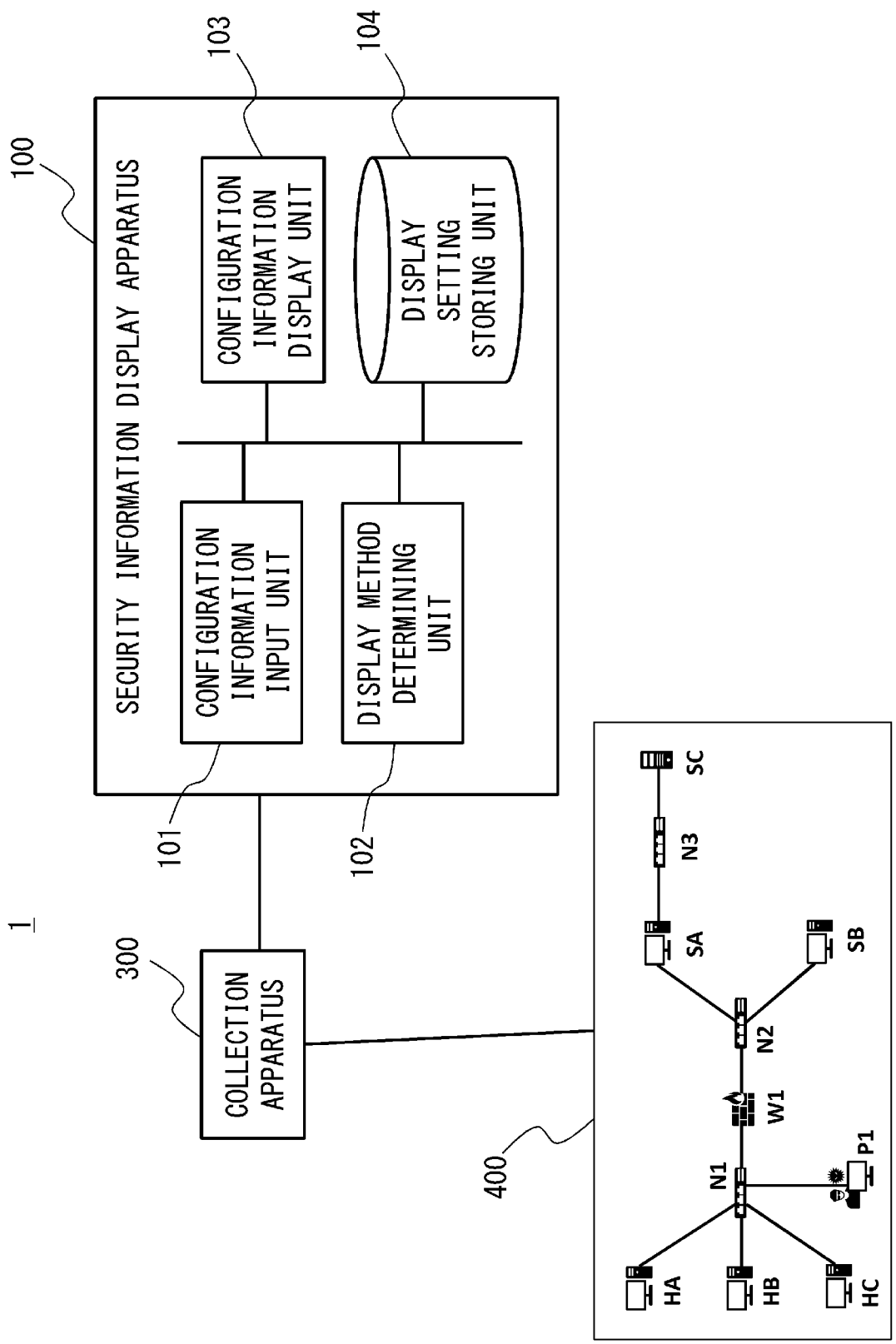
FIG. 5 is a configuration diagram showing an example of another configuration of a display system according to the first example embodiment.

The configuration information DB 200 is a database that stores in advance configuration information of an information system to be displayed (to be analyzed). Aside from the configuration information DB, any information necessary for a user may be input to the security information display apparatus 100. Furthermore, as shown in FIG. 5, necessary information may be collected from an information system. In the example shown in FIG. 5, a display system 1 includes a security information display apparatus 100, a collection apparatus 300, and an information system 400. As with the configuration shown in FIGS. 1 and 2, the information system 400 includes, for example, hosts HA to HC, subnets N1 to N3, a firewall W1, servers SA to SC, and an attacker PC P1. The collection apparatus 300 collects (acquires) configuration information from, for example, a host in the information system 400 in operation and inputs the collected configuration information to the security information display apparatus 100.

The security information display apparatus 100 displays a system configuration diagram representing security information, based on configuration information of an information system. A system configuration diagram displayed by the security information display apparatus 100, for example, allows a user to grasp (specify) a range for an analysis to be performed by an analyzing system, but the use of a system configuration diagram is not limited to an analysis by an analyzing system.

In this example, the security information display apparatus 100 stores in advance information regarding association between each security characteristic with its corresponding display method and determines a display method based on a security characteristic included in input configuration information. As shown in FIG. 4, the security information display apparatus 100 includes a configuration information input unit 101, a display method determining unit 102, a configuration information display unit 103, and a display setting storing unit 104. Herein, the security information display apparatus 100 may have a different configuration as long as the security information display apparatus 100 is capable of performing an operation described later.

The configuration information input unit 101 acquires configuration information of an information system from, for example, the configuration information DB 200 or the collection apparatus 300. Configuration information is, for example, hardware information, software information, network information (connection information), or various pieces of setting information of a host (node) constituting an information system. Configuration information includes information necessary for determining, for example, a security characteristic of a host or a security characteristic of host-to-host communication.

Based on acquired configuration information, the display method determining unit 102 determines (decides on) a display mode corresponding to a security characteristic of a host or of host-to-host communication in the configuration information. For example, the display method determining unit 102 refers to display setting information stored in the display setting storing unit 104 and determines a display method in accordance with a setting in the display setting information. Vulnerability information and so forth necessary for determining a security characteristic may be stored in a storage unit of the security information display apparatus 100 or may be acquired from an external DB or server. In the present example, with an object of security information display presumed to be a host or host-to-host communication, a display method corresponding to a security characteristic of the host or of the host-to-host communication is determined.

FIG. 6 shows examples of security characteristics of a host and examples of display methods of displaying a host. Examples of security characteristics of a host include, among others, the presence or absence of a vulnerability, the presence or absence of an operational service, the presence or absence of a filter provided by a host firewall, the presence or absence of a data flow to be transmitted or received, the presence or absence of a credential, the presence or absence of a user operation, or the presence or absence of a security measure product. A vulnerability is acquired from, for example, a public database of vulnerability information, such as the Common Vulnerabilities and Exposures (CVE) or the National Vulnerability Database (NVD). An operational service is a service (server service), such as telnet or ssh, that affects a security risk. A credential (authentication information) is a login credential, such as user ID/password, and is a login credential for logging in to a host in question from another host (login credential of another host) or a login credential for logging in to another host from a host in question. A user operation is an operation, such as execution of an unauthorized file, that affects a security risk. A security measure product is, for example, antivirus software or an application whitelist.

Examples of display methods of displaying a host include, among others, changing the color of a host, changing the background color of a host, changing an icon for a host, or changing a label displayed next to a host, in accordance with a security characteristic of the host. Any one of these display methods may be adopted, or some of these display methods may be combined. For example, as shown in FIG. 6, in accordance with a security characteristic of a host, the color of the icon for the host may be changed from black to red, the background color of the host may be changed from green to red, the icon for the host may be changed from an icon of a desktop PC to an icon of a stack server, or the label attached to the host, the color of such a label, or the position of such a label may be changed. A label to be displayed may be any one of, for example, a character, a symbol, or an icon, or may be a combination thereof. For example, changing a display method for each security characteristic of a host allows a user to recognize what kind of security risk the host is facing. Furthermore, changing a display method in accordance with a combination of security characteristics of a host allows a user to recognize what kind of security risk may arise in the host as a result of that combination.

FIG. 7 shows examples of security characteristics of host-to-host communication and examples of display methods of displaying host-to-host communication. Examples of security characteristics of host-to-host communication include, among others, the direction of a session, the direction of file movement, the presence or absence of encryption of communication, the presence or absence of a login credential, the presence or absence of a command to operate a destination host, the presence or absence of a vulnerability in a server/client program, the presence or absence of a network firewall, the presence or absence of an intrusion detection system (IDS)/an intrusion prevention system (IPS), or the presence or absence of login service communication. The direction of file movement includes bidirectional movement or unidirectional movement (forward direction or reverse direction relative to session), and there may be a case with no file transfer. Encryption of communication is done, for example, by Secure Sockets Layer (SSL) or Transport Layer Security (TLS). A login service is, for example, ssh or Remote Desktop (RDP).

Examples of display methods of displaying host-to-host communication include, among others, changing the direction of an arrow representing communication (session), changing the color of a line representing communication, changing the thickness of a line representing communication, changing the type of a line (solid line, dotted line, double line, dashed line, wave line, etc.) representing communication, changing the label (character, symbol, illustration, etc.) on a line representing communication, or changing the background color of a line representing communication, in accordance with a security characteristic of the host-to-host communication. Any one of these display methods may be adopted, or some of these display methods may be combined. For example, changing a display method for each security characteristic of host-to-host communication allows a user to recognize what kind of security risk the host-to-host communication is facing. Furthermore, changing a display method in accordance with a combination of security characteristics of host-to-host communication allows a user to recognize what kind of security risk may arise in the host-to-host communication as a result of that combination.

The display method determining unit 102 may change a display method in accordance with the classification of a security characteristic. Security characteristics, including security characteristics of a host and security characteristics of host-to-host communication, can be classified. FIG. 8 shows examples of classification of security characteristics. In one example, a security characteristic is classified as an attackable element, a security measure element, an attack target element, or an attack condition element. For example, a display method is changed for each of these classes (characteristic classes) or for each classification element classified by a characteristic class. A display method may be changed in a manner similar to those shown in FIG. 6 or 7 or may be changed in some other methods. This configuration allows a user to recognize what kind of characteristic a security characteristic of a host or of host-to-host communication has. Furthermore, a display method may be changed in accordance with a combination of a plurality of characteristic classes or a combination of a plurality of classification elements. Such a configuration allows a user to recognize what kind of security risk may arise as a result of a plurality of combinations.

An attackable element, an element to be attacked, is an element to be used for an attack and includes an element concerning a vulnerability, an element concerning a communication environment, or an element concerning a service environment. An element concerning a vulnerability includes, for example, a characteristic of a vulnerability or the number of vulnerabilities at a host or in host-to-host communication. A characteristic (type) of a vulnerability is, for example, code execution, data alteration, data theft, or DoS. An element concerning a communication environment includes, for example, in host-to-host communication, the presence or absence of an unencrypted communication protocol, the presence or absence of data in a communication flow, the presence or absence of a command in a communication flow, or the presence or absence of a credential in a communication flow. An element concerning a service environment includes, for example, the presence or absence of a network service in operation at a host.

A security measure element is an element for preventing an attack and can be classified as either a security measure element 1 or a security measure element 2.

A security measure element 1 is an element classified by a measure environment and includes an element concerning a security measure function and an element concerning a security setting environment. An element concerning a security measure function includes, for example, at a host or in host-to-host communication, the presence or absence of an IDS/an IPS, the presence or absence of a network firewall, the presence or absence of an antivirus function, or the presence or absence of another security measure product. An element concerning a security setting environment includes, for example, at a host, the presence or absence of a log collection setting, the presence or absence of a change in a default port number, or other settings of an operating system (OS).

A security measure element 2 is an element classified by the purpose of a measure and includes an element aimed at protection, an element aimed at detection, or an element aimed at continuation of business. An element aimed at protection includes, for example, at a host, the presence or absence of a filter provided by a firewall, the presence or absence of an antivirus function, the presence or absence of an application whitelist, the presence or absence of a web application firewall (WAF), the presence or absence of two-factor authentication, the presence or absence of file encryption, or the presence or absence of an IPS. An element aimed at detection includes, for example, at a node, the presence or absence of a log management and collection function, the presence or absence of an operational resource monitoring function, or the presence or absence of an IDS. An element aimed at continuation of business includes, for example, at a host or in host-to-host communication, the presence or absence of a backup or the presence or absence of a redundant configuration.

An attack target element is an element that may become a target of an attack and includes, for example, the presence or absence of confidential information at a host. An attack condition element is an element that serves as a condition necessary for an attack and includes, for example, the presence or absence of a user operation at a host or the direction of a session or the direction of file movement in host-to-host communication.

The configuration information display unit 103 is a display apparatus that displays a system configuration diagram. The configuration information display unit 103 may be, for example, a liquid-crystal display or an organic EL display or may be an apparatus external to the security information display apparatus 100. When displaying a system configuration diagram, the configuration information display unit 103 displays hosts and so forth through a GUI in accordance with a display method determined by the display method determining unit 102. The configuration information display unit 103 displays icons for hosts and the relationship of connection between the hosts and further provides display corresponding to a display method.

The display setting storing unit 104 stores display setting information necessary for determining a display method.

Figure 9:
FIG. 9 shows an example of display setting information according to the first example embodiment.

The display setting storing unit 104 is, for example, a non-volatile memory, such as a flash memory, or a hard disk device. FIG. 9 shows an example of display setting information stored in the display setting storing unit 104. As shown in FIG. 9, display setting information associates (ties) a security characteristic of each object of display with a display method. Furthermore, in order to provide display corresponding to an object of security information display or to classification (or classification element), display setting information associates an object of security information display, a characteristic class (or classification element), a security characteristic, and a display method with each other. These items may be associated with each other by a plurality of tables. In the example shown in FIG. 9, the direction of a session is associated with the direction of an arrow, the direction of file movement is associated with the color of a line, the presence or absence of encryption is associated with the type of a line, or the presence or absence of a credential is associated with a label. Furthermore, an association may be provided to a display method resulting from a combination of classes or a display method resulting from a combination of security characteristics.

Figure 10:
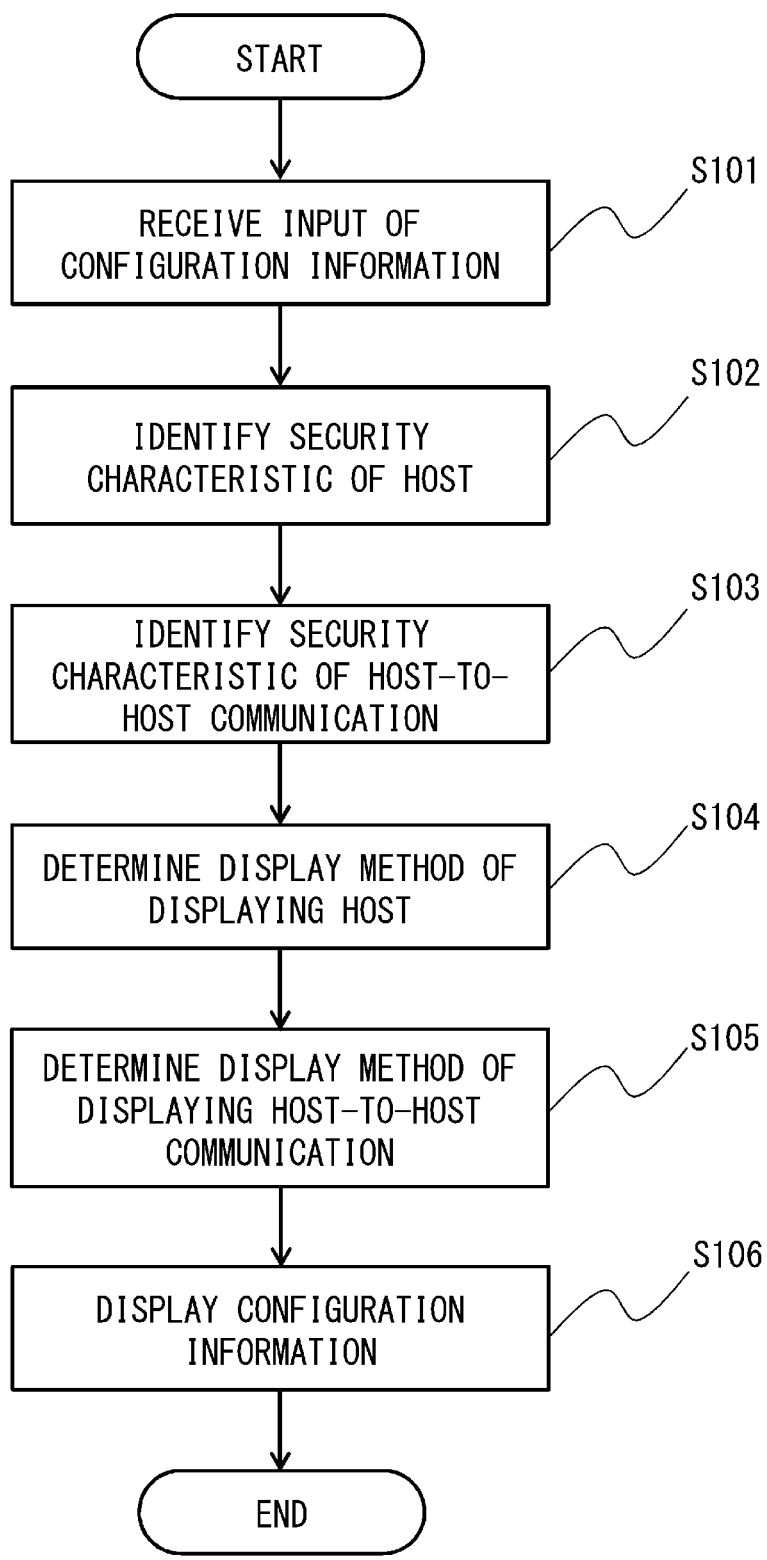
FIG. 10 is a flowchart showing an example of an operation of a security information display apparatus according to the first example embodiment.

FIG. 10 shows an example of an operation (display method) of the security information display apparatus 100 according to the present example embodiment. As shown in FIG. 10, the security information display apparatus 100 receives input of configuration information of an information system in question (S101). For example, in order to estimate a range for an analysis of an information system to be analyzed by an analyzing system, a user inputs configuration information of the information system to the security information display apparatus 100. For example, the configuration information input unit 101 acquires configuration information from the configuration information DB 200 storing the configuration information in advance or acquires configuration information that the collection apparatus 300 has collected from, for example, a host in the information system. The configuration information input unit 101 may acquire configuration information from either one of the configuration information DB 200 or the collection apparatus 300 or may acquire configuration information from each of the configuration information DB 200 and the collection apparatus 300 as necessary.

The security information display apparatus 100 identifies a security characteristic of a host in the information system (S102) and identifies a security characteristic of host-to-host communication (S103).

The display method determining unit 102 extracts information concerning all the hosts included in the input configuration information and identifies a security characteristic of each host. Based on the acquired information concerning the hosts, the display method determining unit 102 identifies (determines) a security characteristic of each host registered in display setting information in the display setting storing unit 104. As described above, the display method determining unit 102 identifies, for example, the presence or absence of a vulnerability, the presence or absence of an operational service, the presence or absence of a filter provided by a host firewall, the presence or absence of a data flow to be transmitted or received, the presence or absence of a credential, the presence or absence of a user operation, or the presence or absence of a security measure product.

Furthermore, the display method determining unit 102 extracts information concerning all the host-to-host communication included in the configuration information and identifies a security characteristic of each host-to-host communication. Based on the acquired information concerning the host-to-host communication, the display method determining unit 102 identifies (determines) a security characteristic of each host-to-host communication registered in the display setting information in the display setting storing unit 104. As described above, the display method determining unit 102 identifies, for example, the direction of a session, the direction of file movement, the presence or absence of encryption of communication, the presence or absence of a login credential, the presence or absence of a command to operate a destination host, the presence or absence of a vulnerability in a server/client program, the presence or absence of a network firewall, the presence or absence of an IDS/an IPS, or the presence or absence of login service communication.

The security information display apparatus 100 determines a display method of displaying a host based on its security characteristic (S104) and determines a display method of displaying host-to-host communication based on its security characteristic (S105).

Having identified a security characteristic of a host, the display method determining unit 102 determines (decides on) a display method of displaying the host in accordance with the identified security characteristic. The display method determining unit 102 refers to the display setting information in the display setting storing unit 104 and determines a display method of displaying each host based on the display method associated with the security characteristic of the host.

FIG. 11 shows examples of display of security characteristics of a host. In the examples shown in FIG. 11, an icon LA1 (red) is added to a host if the host has a vulnerability, an icon LA2 (red) is added to a host if the host has an operational service, an icon LA3 (red) is added to a host if the host has a filter provided by a host firewall, an icon LA4 (red) is added to a host if the host has data to transmit, an icon LA5 (red) is added to a host if the host has data to receive, an icon LA6 (red) is added to a host if the host has a credential, an icon LA7 (red) is added to a host if the host has (is capable of) an user operation, or an icon LA8 (blue) is added to a host if the host has a security measure product.

In this example, a characteristic concerning an element that may be attacked (attackable element) is displayed by a red icon, and a characteristic concerning a security measure (preventive measure element) is displayed by a blue icon. The shapes of these icons (labels) are merely examples and are not limited by these examples. Furthermore, although the presence or absence of display of each label is determined based on the presence or absence of an element of each characteristic in this example, the display method is not limited to this display method. For example, a label to be added or a manner in which an icon for a host is displayed (color, shape, size, depth of dots or hatching, etc.) may be changed in accordance with the number of elements of each characteristic or the level of a risk. As a risk is higher, an icon is displayed in a more emphatic manner by, for example, a brighter color or a greater size. Conversely, as a risk is lower, an icon is displayed in a less emphatic, more subdued manner by, for example, a darker color or a smaller size. For example, an icon may be displayed in a more emphatic manner as the number of vulnerabilities is greater or as the risk is higher due to the type of a vulnerability. Furthermore, an icon may be displayed in a more emphatic manner as the number of attackable elements is greater and may be displayed in a more subdued manner as the number of preventive measure elements is greater. Moreover, an icon may be displayed in an emphatic manner or in a subdued manner in accordance with the difference between the number of attackable elements and the number of preventive measure elements.

Meanwhile, having identified a security characteristic of host-to-host communication, the display method determining unit 102 determines (decides on) a display method of displaying the host-to-host communication in accordance with the identified security characteristic. The display method determining unit 102 refers to the display setting information in the display setting storing unit 104 and determines a display method of displaying each host-to-host communication based on the display method associated with the security characteristic of the host-to-host communication.

FIG. 12 shows examples of display of security characteristics of host-to-host communication. In the examples shown in FIG. 12, the direction of a session is expressed by the direction of an arrow, the direction of file movement is expressed by the color of an arrow, or the presence or absence of encryption of communication is expressed by the type of a line. For example, with regard to the direction of file movement, an arrow may be red if the movement is bidirectional, may be green if the movement is in the forward direction, may be orange if the movement is in the reverse direction, or may be black if there is no file transfer, or an arrow may be color-coded between bidirectional movement and unidirectional movement (forward direction and reverse direction relative to session), or an arrow may be color-coded based on the presence or absence of a file transfer. With regard to encryption of communication, an arrow may be a solid arrow if there is encryption or may be a dotted arrow if there is no encryption.

An icon LB1 is added to an arrow if a login credential is present, an icon LB2 is added to an arrow if a command to operate a destination host is present, an icon LB3 is added to each end of an arrow if a vulnerability is present in a server/client program, an icon LB4 is added to an arrow if a network firewall is present, an icon LB5 is added to an arrow if an IDS/an IPS is present, or an icon LB6 is added to an arrow if login service communication is present. As with the examples of display of hosts, the shapes of these icons (labels) or the manners in which the lines are expressed, for example, are merely examples and are not limited by these examples. For example, a label to be added or a manner in which an icon for host-to-host communication is displayed may be changed in accordance with the number of elements of each characteristic or the level of a risk.

The security information display apparatus 100 displays configuration information (system configuration diagram) (S106). In the system configuration diagram, the configuration information display unit 103 displays the hosts and host-to-host communication in accordance with the determined display methods.

Figure 13:
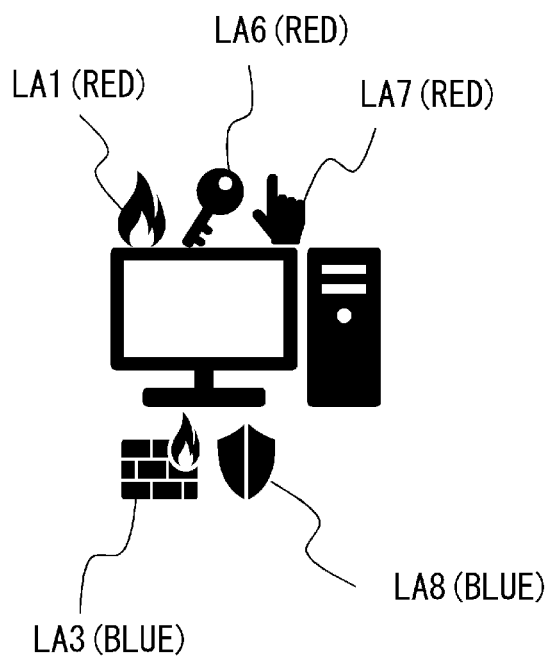
FIG. 13 shows a specific example of how a host is displayed according to the first example embodiment.

FIG. 13 shows an example of display of a host displayed according to a determined display method. In this example, icons LA1 (red), LA6 (red), LA7 (red), LA3 (blue), and LA8 (blue) are displayed for a host. Therefore, based on the display methods shown in FIG. 11, a glance at this display informs a user that this host has a vulnerability, has a login credential of another host, has a user operation, has communication restricted by a host firewall, and has a security measure product installed therein. Furthermore, the red and blue icons simultaneously show that there are three characteristics that may be attacked and two characteristics that may provide protection.

Figure 14:
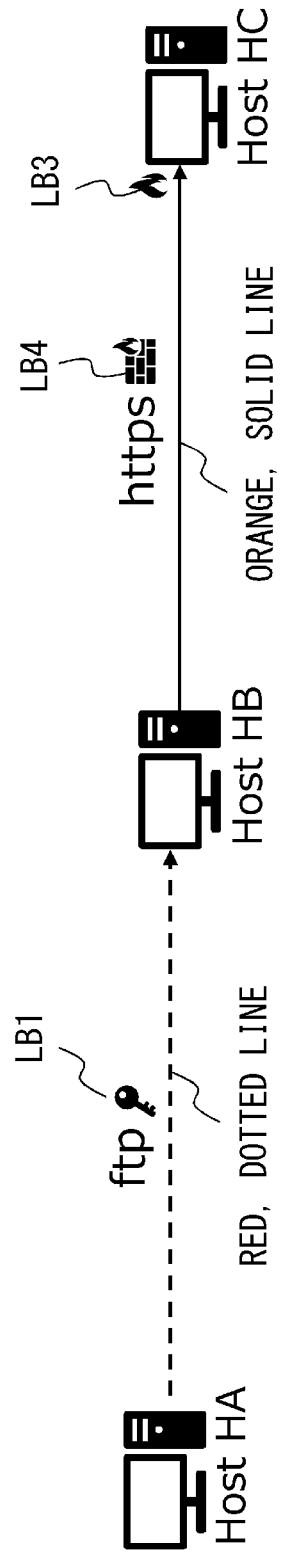
FIG. 14 shows a specific example of how host-to-host communication is displayed according to the first example embodiment.

FIG. 14 shows an example of display of host-to-host communication displayed according to a determined display method. In this example, an arrow from a host HA to a host HB is displayed by a red dotted line and has an icon LB1 displayed next to the arrow. Therefore, based on the display methods shown in FIG. 12, a user can see that there is a session stretched from the host HA to the host HB, there is a bidirectional file share, there is no encryption, and there is a credential. Furthermore, an arrow from the host HB to a host HC is displayed by an orange solid line, an icon LB4 is displayed next to the arrow, and an icon LB3 is displayed at the tip of the arrow. Therefore, a user can grasp that there is a session stretched from the host HB to the host HC, a file is downloaded from the host HC, the communication is encrypted, communication with a firewall in between is permitted, and a program waiting for the https of the host HC has a vulnerability.

Figure 15:
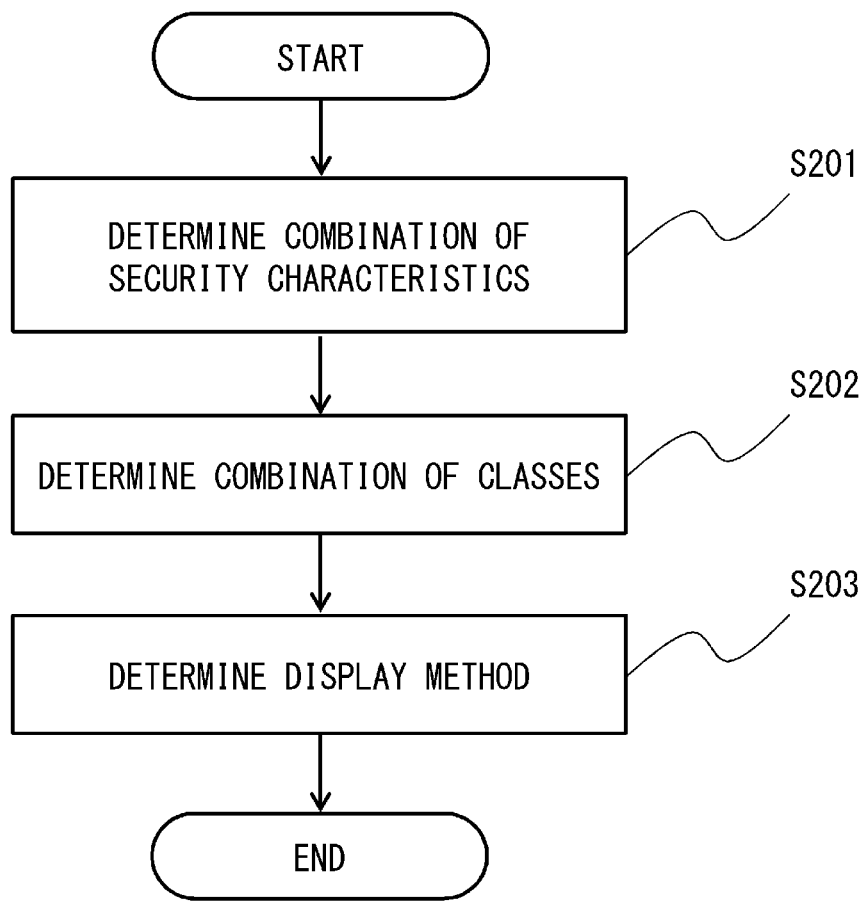
FIG. 15 is a flowchart showing an example of a display method determining process according to the first example embodiment.

FIG. 15 shows an example of how a display method is determined based on a combination of characteristics and of classes. For example, this determination of combinations can be performed in the determination of a display method of displaying a host (S104) and in the determination of a display method of displaying host-to-host communication (S105) shown in FIG. 10. The example may be applied to either of or both of the determination of a display method of displaying a host and the determination of a display method of displaying host-to-host communication.

As show FIG. 15, the display method determining unit 102 determines a combination of security characteristics (S201), determines a combination of classes of security characteristics (S202), and determines a display method in accordance with the results of these determinations (S203). For example, in display setting information in the display setting storing unit 104, combinations of security characteristics are associated with display methods, and combinations of classes are associated with display methods. The display method determining unit 102 determines a combination of security characteristics and a combination of classes (characteristic classes or classification elements) registered in the display setting information and determines the display method associated with these combinations.

Such a combination may be a combination of a specific security characteristic and another specific security characteristic, a combination of a specific class and another specific class, or a combination of a specific security characteristic and a specific class. The number of characteristics or classes to be combined is not limited to two, and three or more characteristics or classes may be combined. For example, a display method may be changed if a risk increases or decreases due to a given combination. If a condition for a specific attack is satisfied by two characteristics (or classes), display is provided such that it shows that a risk is high (emphatic display, etc.). If protection against a specific attack is provided by two characteristics (or classes), display is provided such that it shows that a risk is low (deletion of label, etc.).

In one example of a combination, a display method may be determined in accordance with a combination of a first security characteristic of an attackable element and a second security characteristic of a preventive measure element. A combination of an attackable element and a preventive measure element may lower a risk, and therefore the display shows that the risk is low. Meanwhile, a combination of a specific security characteristic of an attackable element and a specific security characteristic of a preventive measure element may further lower a risk, and therefore the display shows that the risk is even lower.

A display method may be determined in accordance with a combination of a first security characteristic in an attackable element and a second security characteristic in another attackable element. A combination of an attackable element and another attackable element may increase a risk, and therefore the display shows that the risk is high. Meanwhile, a combination of a specific security characteristic of an attackable element and a specific security characteristic of another attackable element may further increase a risk, and therefore the display shows that the risk is even higher.

A display method may be determined in accordance with a combination of a first security characteristic in a preventive measure element and a second security characteristic included in another preventive measure element. A combination of a preventive measure element and another preventive measure element may lower a risk, and therefore the display shows that the risk is low. Meanwhile, a combination of a specific security characteristic of a preventive measure element and a specific security characteristic of another preventive measure element may further lower a risk, and therefore the display shows that the risk is even lower. A display method may be determined in accordance with a combination of, for example, a security characteristic of an attack target element and a security characteristic of an attack condition element.

Figure 16:
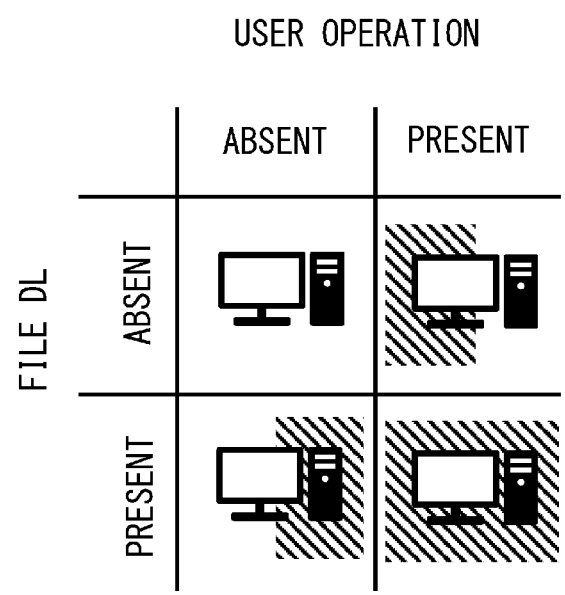
FIG. 16 shows examples of display resulting from combinations of security characteristics according to the first example embodiment.

FIG. 16 shows an example of display resulting from a combination of security characteristics of a host. If there is a user operation at a host and a file is being downloaded, execution of a code in an unauthorized executable file can be achieved by causing a legitimate user to download and open the unauthorized executable file, and thus a risk increases. For example, the background color is changed in accordance with a combination of characteristics concerning the security. In this example, the background color of an icon for a host is changed in accordance with the presence or absence of a user operation and the presence or absence of a file download. For example, the background of a host is in a solid color if there is no user operation and there is no file download, the color of the background of a host in the right half is changed (e.g., red) if there is no user operation but there is a file download, the color of the background of a host in the left half is changed (e.g., red) if there is a user operation but there is no file download, or the color of the entire background of a host is changed (e.g. red) if there is a user operation and there is a file download.

Figure 17:
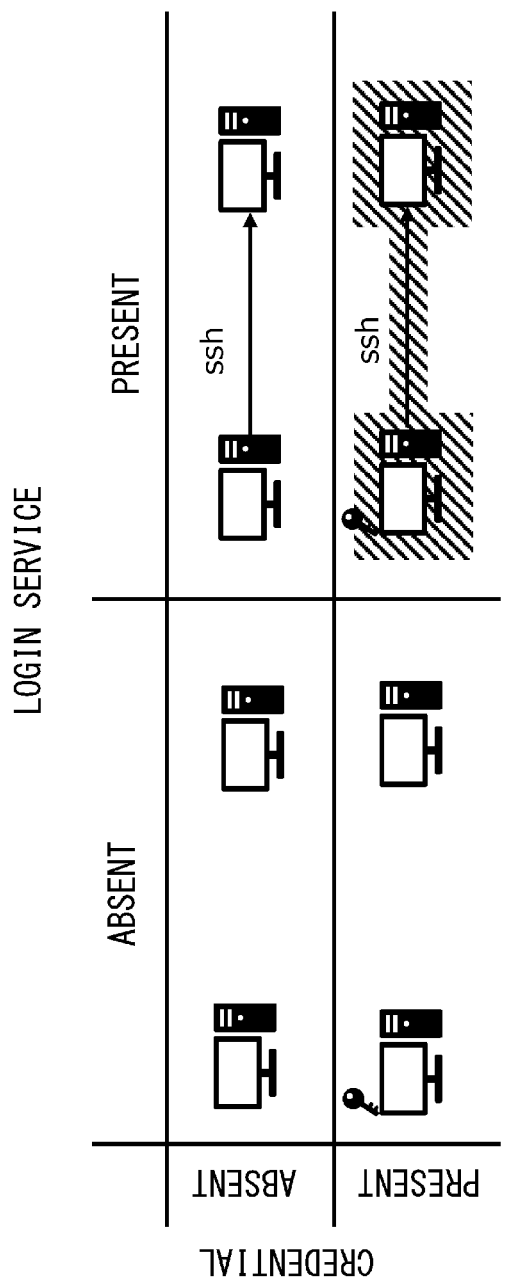
FIG. 17 shows examples of display resulting from combinations of security characteristics according to the first example embodiment.

FIG. 17 shows an example of display resulting from a combination of a security characteristic of a host and a security characteristic of host-to-host communication. If there is a credential at a host and there is a login service from this host to another host, an attacker can steal the credential at this host and log in to the other host, and thus a risk increases. For example, the background color is changed in accordance with a combination of characteristics concerning the security. In this example, the color of the entire background of hosts and host-to-host communication is changed in accordance with the presence or absence of a credential at a host and the presence or absence of a login service in the host-to-host communication. For example, the color of the entire background of two icons for the respective hosts and an arrow representing the host-to-host communication is changed (e.g., red) if there is a credential at a host and there is a login service in the host-to-host communication.

As described above, in the present example embodiment, when a system configuration diagram of an information system is displayed, display methods of displaying hosts and host-to-host communication are changed based on security characteristics of the hosts or of the host-to-host communication. Furthermore, security characteristics are classified based on their elements, and display is provided by a display method corresponding to the classification result or by a display method corresponding to a combination of security characteristics. This configuration allows a user, glancing at the display, to grasp a site with a high likelihood of being attacked.

Second Example Embodiment

Figure 18:
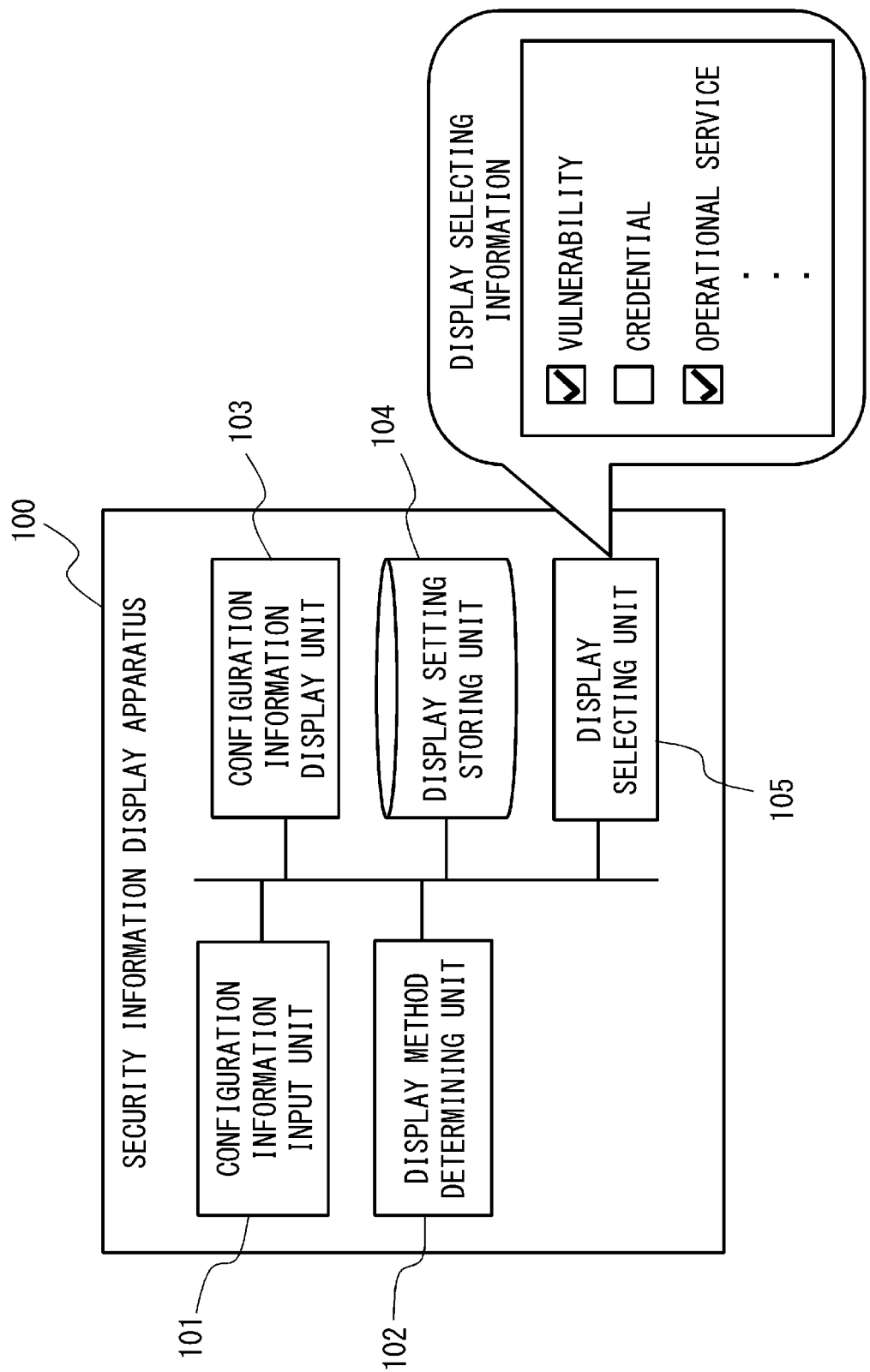
FIG. 18 is a configuration diagram showing an example of a configuration of a security information display apparatus according to a second example embodiment.

Next, a second example embodiment will be described. FIG. 18 shows an example of a configuration of a security information display apparatus according to the present example embodiment. As shown in FIG. 18, a security information display apparatus 100 according to the present example embodiment includes, in addition to the components according to the first example embodiment, a display selecting unit 105.

The display selecting unit 105 switches between (selects from) display/hide for each security characteristic for determining a display method. For example, the display selecting unit 105 stores display selecting information, and a user sets display/hide for each security characteristic in display selecting information in the display setting storing unit 104. The configuration information display unit 103 displays a security characteristic in accordance with the display selecting information in the display selecting unit 105. Only a security characteristic that is set to be displayed in the display selecting information is displayed.

If all the security characteristics are displayed, too much information may be displayed, and this may make it harder to visually recognize necessary information. When the display/hide setting is configured for each security characteristic as in the present example embodiment, only the information that a user needs can be displayed, allowing the user to grasp a security risk at a glance.

It is to be noted that the present disclosure is not limited by the foregoing example embodiments, and modifications can be made, as appropriate, within the scope that does not depart from the technical scope and spirit.

Figure 19:
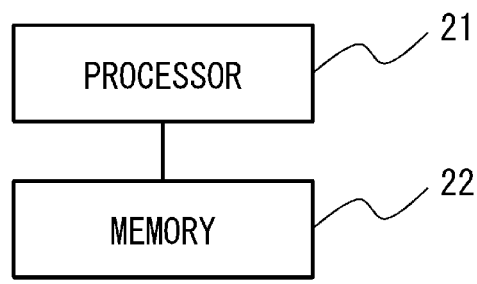
FIG. 19 is a configuration diagram showing an outline of hardware of a computer according to an example embodiment.

Each of the components according to the foregoing example embodiments may be constituted by hardware or software or both. Each of the components may be constituted by a single piece of hardware or software or by a plurality of pieces of hardware or software. Each of the devices and the functions (processes) may be implemented by a computer 20 that includes a processor 21, such as a central processing unit (CPU), and a memory 22 serving as a storage device, as shown in FIG. 19. For example, a program for performing a method (display method) according to an example embodiment may be stored in the memory 22, and each of the functions may be implemented as the processor 21 executes the program stored in the memory 22.

Such a program can be stored and provided to a computer with use of various types of non-transitory computer-readable media. Non-transitory computer-readable media include various types of tangible storage media. Examples of such non-transitory computer-readable media include a magnetic recording medium (e.g., flexible disk, magnetic tape, hard-disk drive), a magneto-optical recording medium (e.g., magneto-optical disk), a CD-ROM (read-only memory), a CD-R, a CD-R/W, or a semiconductor memory (e.g., mask ROM, programmable ROM (PROM), erasable PROM (EPROM), flash ROM, random-access memory (RAM)). The program may be supplied to a computer also with use of various types of transitory computer-readable media. Examples of such transitory computer-readable media include an electric signal, an optical signal, or an electromagnetic wave. A transitory computer-readable medium can supply a program to a computer via a wired communication line, such as an electric wire or an optical fiber, or via a wireless communication line.

Thus far, the present disclosure has been described with reference to example embodiments, but the foregoing example embodiments do not limit the present disclosure. Various modifications that a person skilled in the art can appreciate can be made to the configuration and the details of the present disclosure within the scope of the present disclosure.

Part or the whole of the foregoing example embodiments can be expressed also as in the following supplementary notes, which are not limiting.

(Supplementary Note 1)

A display apparatus comprising:
acquiring means for acquiring configuration information of an information system that includes a plurality of nodes;
determining means for determining a display method of displaying an object of security information display concerning a node in the acquired configuration information, based on a security characteristic of an attackable element used to attack the object of security information display and a security characteristic of a preventive measure element preventing an attack on the object of security information display; and
display means for, when displaying a system configuration of the information system, displaying the object of security information display in accordance with the determined display method.

(Supplementary Note 2)

The display apparatus according to Supplementary Note 1, wherein the attackable element includes any of an element concerning a vulnerability, an element concerning a communication environment, or an element concerning a service environment.

(Supplementary Note 3)

The display apparatus according to Supplementary Note 2, wherein the element concerning a vulnerability includes the number of vulnerabilities in the object of security information display or a type of a vulnerability in the object of security information display.

(Supplementary Note 4)

The display apparatus according to Supplementary Note 2 or 3, wherein the element concerning a communication environment includes, in communication between the nodes any of, the presence or absence of an unencrypted communication protocol, the presence or absence of data in a communication flow, the presence or absence of a command in a communication flow, or the presence or absence of a credential in a communication flow.

(Supplementary Note 5)

The display apparatus according to any one of Supplementary Notes 2 to 4, wherein the element concerning a service environment includes the presence or absence of a network service in operation at the node.

(Supplementary Note 6)

The display apparatus according to any one of Supplementary Notes 1 to 5, wherein the preventive measure element includes any of an element concerning a security measure function or an element concerning a security setting environment.

(Supplementary Note 7)

The display apparatus according to Supplementary Note 6, wherein the element concerning a security measure function includes the presence or absence of an antivirus function at the node.

(Supplementary Note 8)

The display apparatus according to Supplementary Note 6 or 7, wherein the element concerning a security measure function includes any of, at the node or in communication between the nodes, the presence or absence of an intrusion detection system (IDS) or an intrusion prevention system (IPS), the presence or absence a network firewall function, or the presence or absence of an antivirus function.

(Supplementary Note 9)

The display apparatus according to any one of Supplementary Notes 6 to 8, wherein the element concerning a security setting environment includes any of, at the node, the presence or absence of a log collection setting or the presence or absence of a change in a default port number.

(Supplementary Note 10)

The display apparatus according to any one of Supplementary Notes 1 to 5, wherein the preventive measure element includes any of an element aimed at protection, an element aimed at detection, or an element aimed at continuation of business.

(Supplementary Note 11)

The display apparatus according to Supplementary Note 10, wherein the element aimed at protection includes any of, at the node, the presence or absence of a filter provided by a firewall, the presence or absence of an antivirus function, the presence or absence of an application whitelist, the presence or absence of a web application firewall (WAF), the presence or absence of two-factor authentication, the presence or absence of file encryption, or the presence or absence of an IPS.

(Supplementary Note 12)

The display apparatus according to Supplementary Note 10 or 11, wherein the element aimed at detection includes any of, at the node, the presence or absence of a log management and collection function, the presence or absence of an operational resource monitoring function, or the presence or absence of an IDS.

(Supplementary Note 13)

The display apparatus according to any one of Supplementary Notes 10 to 12, wherein the element aimed at continuation of business includes any of, at the node or in communication between the nodes, the presence or absence of a backup or the presence or absence of a redundant configuration.

(Supplementary Note 14)

The display apparatus according to any one of Supplementary Notes 1 to 13, wherein the determining means determines the display method based on a combination of a first security characteristic of the attackable element and a second security characteristic of the preventive measure element.

(Supplementary Note 15)

The display apparatus according to any one of Supplementary Notes 1 to 13, wherein the determining means determines the display method based on a combination of a security characteristic of a first element of the attackable element and a second security characteristic of the attackable element.

(Supplementary Note 16)

The display apparatus according to any one of Supplementary Notes 1 to 13, wherein the determining means determines the display method based on a combination of a first security characteristic of the preventive measure element and a second security characteristic of the preventive measure element.

(Supplementary Note 17)

The display apparatus according to any one of Supplementary Notes 1 to 16, wherein the determining means determines the display method based further on a security characteristic of an attack target element and a security characteristic of an attack condition element.

(Supplementary Note 18)

The display apparatus according to Supplementary Note 17, wherein the attack target element includes the presence or absence of confidential information at the node.

(Supplementary Note 19)

The display apparatus according to Supplementary Note 17 or 18, wherein the attack condition element includes any of the presence or absence of a user operation at the node, a direction of a session in communication between the nodes, or a direction of file movement in communication between the nodes.

(Supplementary Note 20)

The display apparatus according to any one of Supplementary Notes 1 to 19, further comprising display selecting means for selecting a security characteristic for determining the display method.

(Supplementary Note 21)

A display system comprising:
a plurality of nodes constituting an information system; and
a display apparatus,
wherein the display apparatus includes
    acquiring means for acquiring configuration information of the information system,
    determining means for determining a display method of displaying an object of security information display concerning a node in the acquired configuration information, based on a security characteristic of an attackable element used to attack the object of security information display and a security characteristic of a preventive measure element preventing an attack on the object of security information display, and
    display means for, when displaying a system configuration of the information system, displaying the object of security information display in accordance with the determined display method.

(Supplementary Note 22)

A display method comprising:
acquiring configuration information of an information system that includes a plurality of nodes;
determining a display method of displaying an object of security information display concerning a node in the acquired configuration information, based on a security characteristic of an attackable element used to attack the object of security information display and a security characteristic of a preventive measure element preventing an attack on the object of security information display; and
when displaying a system configuration of the information system, displaying the object of security information display in accordance with the determined display method.

(Supplementary Note 23)

A non-transitory computer-readable medium storing a display program that causes a computer to execute the processes of:
acquiring configuration information of an information system that includes a plurality of nodes;
determining a display method of displaying an object of security information display concerning a node in the acquired configuration information, based on a security characteristic of an attackable element used to attack the object of security information display and a security characteristic of a preventive measure element preventing an attack on the object of security information display; and
when displaying a system configuration of the information system, displaying the object of security information display in accordance with the determined display method.

REFERENCE SIGNS LIST

1 DISPLAY SYSTEM
10 DISPLAY APPARATUS
11 ACQUIRING UNIT
12 DETERMINING UNIT
13 DISPLAY UNIT
20 COMPUTER
21 PROCESSOR
22 MEMORY
100 SECURITY INFORMATION DISPLAY APPARATUS
101 CONFIGURATION INFORMATION INPUT UNIT
102 DISPLAY METHOD DETERMINING UNIT
103 CONFIGURATION INFORMATION DISPLAY UNIT
104 DISPLAY SETTING STORING UNIT
105 DISPLAY SELECTING UNIT
300 COLLECTION APPARATUS
400 INFORMATION SYSTEM

What is claimed is:

1. A display apparatus comprising:
at least one memory storing instructions, and
at least one processor configured to execute the instructions stored in the at least one memory to;
acquire configuration information of an information system that includes a plurality of nodes;
determine a display manner of displaying an object of security information display concerning a node in the acquired configuration information, based on a security characteristic of an attackable element used to attack the object of security information display and a security characteristic of a preventive measure element preventing an attack on the object of security information display;
when displaying a system configuration diagram of the information system, display the object of security information display in the system configuration diagram in accordance with the determined display manner, and
change the display manner based on a first combination of a first security characteristic of the attackable element and a second security characteristic of the preventive measure element, a second combination of a third security characteristic of the attackable element and a fourth security characteristic of the attackable element, and a third combination of a fifth security characteristic of the preventive measure element and a sixth security characteristic of the preventive measure element.

2. The display apparatus according to claim 1, wherein the attackable element includes any of an element concerning a vulnerability, an element concerning a communication environment, or an element concerning a service environment.

3. The display apparatus according to claim 2, wherein the element concerning a vulnerability includes a characteristic of a vulnerability in the object of security information display or a number of vulnerabilities in the object of security information display.

4. The display apparatus according to claim 2, wherein the element concerning a communication environment includes, in communication between the nodes any of, presence of an unencrypted communication protocol, presence of data in a communication flow, presence of a command in a communication flow, or the presence of a credential in a communication flow.

5. The display apparatus according to claim 2, wherein the element concerning a service environment includes presence of a network service in operation at the node.

6. The display apparatus according to claim 1, wherein the preventive measure element includes any of an element concerning a security measure function or an element concerning a security setting environment.

7. The display apparatus according to claim 6, wherein the element concerning a security measure function includes presence of an antivirus function at the node.

8. The display apparatus according to claim 6, wherein the element concerning a security measure function includes any of, at the node or in communication between the nodes, presence of an intrusion detection system (IDS) or an intrusion prevention system (IPS), presence a network firewall function, or presence of an antivirus function.

9. The display apparatus according to claim 6, wherein the element concerning a security setting environment includes any of, at the node, presence of a log collection setting or presence of a change in a default port number.

10. The display apparatus according to claim 1, wherein the preventive measure element includes any of an element aimed at protection, an element aimed at detection, or an element aimed at continuation of business.

11. The display apparatus according to claim 10, wherein the element aimed at protection includes any of, at the node, presence of a filter provided by a firewall, presence of an antivirus function, presence of an application whitelist, presence of a web application firewall (WAF), presence of two-factor authentication, the presence of file encryption, or the presence of an IPS.

12. The display apparatus according to claim 10, wherein the element aimed at detection includes any of, at the node, presence of a log management and collection function, presence of an operational resource monitoring function, or presence of an IDS.

13. The display apparatus according to claim 10, wherein the element aimed at continuation of business includes any of, at the node or in communication between the nodes, presence of a backup or presence of a redundant configuration.

14. The display apparatus according to claim 1, wherein the at least one processor is further configured to execute the instructions stored in the at least one memory to determine the display manner based further on a security characteristic of an attack target element and a security characteristic of an attack condition element.

15. The display apparatus according to claim 14, wherein the attack target element includes presence of confidential information at the node.

16. The display apparatus according to claim 14, wherein the attack condition element includes any of presence of a user operation at the node, a direction of a session in communication between the nodes, or a direction of file movement in communication between the nodes.

17. The display apparatus according to claim 1, wherein the at least one processor is further configured to execute the instructions stored in the at least one memory to select a security characteristic for determining the display manner.

18. A display system comprising:
a plurality of nodes constituting an information system; and
a display apparatus,
wherein the display apparatus includes
at least one memory storing instructions, and
at least one processor configured to execute the instructions stored in the at least one memory to
acquire configuration information of the information system,
determine a display manner of displaying an object of security information display concerning a node in the acquired configuration information, based on a security characteristic of an attackable element used to attack the object of security information display and a security characteristic of a preventive measure element preventing an attack on the object of security information display,
when displaying a system configuration diagram of the information system, display the object of security information display in the system configuration diagram in accordance with the determined display manner, and
change the display manner based on a first combination of a first security characteristic of the attackable element and a second security characteristic of the preventive measure element, a second combination of a third security characteristic of the attackable element and a fourth security characteristic of the attackable element, and a third combination of a fifth security characteristic of the preventive measure element and a sixth security characteristic of the preventive measure element.

19. A display method performed by a computer and comprising:
acquiring configuration information of an information system that includes a plurality of nodes;
determining a display manner of displaying an object of security information display concerning a node in the acquired configuration information, based on a security characteristic of an attackable element used to attack the object of security information display and a security characteristic of a preventive measure element preventing an attack on the object of security information display;
when displaying a system configuration diagram of the information system, displaying the object of security information display in the system configuration diagram in accordance with the determined display manner; and
changing the display manner based on a first combination of a first security characteristic of the attackable element and a second security characteristic of the preventive measure element, a second combination of a third security characteristic of the attackable element and a fourth security characteristic of the attackable element, and a third combination of a fifth security characteristic of the preventive measure element and a sixth security characteristic of the preventive measure element.

20. A non-transitory computer-readable medium storing a display program executable by a computer to perform processing comprising:
acquiring configuration information of an information system that includes a plurality of nodes;

determining a display manner of displaying an object of security information display concerning a node in the acquired configuration information, based on a security characteristic of an attackable element used to attack the object of security information display and a security characteristic of a preventive measure element preventing an attack on the object of security information display;

when displaying a system configuration diagram of the information system, displaying the object of security information display in the system configuration diagram in accordance with the determined display manner; and changing the display manner based on a first combination of a first security characteristic of the attackable element and a second security characteristic of the preventive measure element, a second combination of a third security characteristic of the attackable element and a fourth security characteristic of the attackable element, and a third combination of a fifth security characteristic of the preventive measure element and a sixth security characteristic of the preventive measure element.

\* \* \* \* \*